United States Patent [19]

Moran

[11] 4,196,686
[45] Apr. 8, 1980

[54] SURFACE EFFECT SHIP INTERNAL SIDEWALL DRAG REDUCTION DEVICE

[75] Inventor: David D. Moran, Silver Spring, Md.

[73] Assignee: The United States of America as represented by the Secretary of the Navy, Washington, D.C.

[21] Appl. No.: 869,965

[22] Filed: Jan. 16, 1978

[51] Int. Cl.² .............................................. B63B 1/38
[52] U.S. Cl. ................................ 114/67 A; 180/120; 180/126
[58] Field of Search ........................... 114/67 R, 67 A; 180/126, 120

[56] References Cited

U.S. PATENT DOCUMENTS

| 3,137,262 | 6/1964 | Tibbetts et al. | 114/67 A |
| 3,205,847 | 9/1965 | Smith | 114/67 A |
| 3,458,007 | 7/1969 | Todd | 180/126 X |
| 3,460,647 | 8/1969 | Laing | 180/120 |

Primary Examiner—Sherman D. Basinger
Attorney, Agent, or Firm—R. S. Sciascia; Q. E. Hodges

[57] ABSTRACT

A sidewall drag reduction system for captured air bubble type surface effect ships having rigid surface-piercing sidewalls. Pressurized air is discharged vertically down into the surface effect ship air cushion chamber from platform ports, and horizontally into the air cushion chamber from nozzles located near the bottom of the internal surface of the sidewalls.

3 Claims, 4 Drawing Figures

EQUIVALENT MODEL DRAG AS A FUNCTION OF VELOCITY WITH AND WITHOUT DRAG REDUCTION

SURFACE EFFECT SHIP INTERNAL SIDEWALL DRAG REDUCTION DEVICE

The invention described herein may be manufactured and used by or for the Government of the United States of America for governmental purposes without the payment of any royalties thereon or therefor.

BACKGROUND OF THE INVENTION

This invention relates to surface effect vehicles, and more particularly to an arrangement for the supply of pressurized air to the air cushion of a surface effect ship of the captured air bubble (CAB) type having rigid surface-piercing sidewalls.

Prior art CAB surface effect ships derive part of their lift through increased pressure in an air cushion chamber defined by rigid sidewalls and flexible bow and stern seals. Chamber pressure is maintained by pumping air into the cushion, and must be continuously resupplied due to leakage under the seals. The sidewalls contribute part of the lift of the vehicle, but are primarily beneficial in effecting sidewall cushion sealing and in providing a site for mounting propulsion apparatus. The surface effect ship suffers a drag penalty proportional to the area of water in contact with the sidewalls, the drag increasing with the speed of the vehicle.

Therefore, there is a need for a surface effect ship having minimum sidewall drag, particularly in high speed applications.

SUMMARY OF THE INVENTION

Accordingly, the present invention provides a system to reduce sidewall drag, and thereby increase the maximum speed of a CAB surface effect ship.

The vehicle air cushion chamber is defined by a pair of parallel rigid surface-piercing sidewalls and flexible bow and stern seals, which depend from a carrier platform. A system of air ducts within the carrier platform connects to air ducts contained within the sidewalls. The platform ducts open into the air cushion chamber through a series of regulating port valves in the top of the chamber, while the sidewall ducts open into the chamber through a series of nozzles on the interior surface near the bottom of the sidewalls. Pressurized air feeds through the ducts and into the air cushion chamber vertically through the port valves and horizontally through the sidewall nozzles. Air discharging through the sidewall nozzles decreases sidewall water contact and thereby decreases sidewall drag.

OBJECTS OF THE INVENTION

It is therefore an object of the present invention to provide a CAB surface effect ship having minimum sidewall drag.

Another object of the present invention is to minimize interior surface water contact with the sidewalls.

Still another object of the present invention is to provide a system for dual-direction air discharge into the air cushion chamber.

A further object of the present invention is to provide for regulating the air pressure within the air cushion chamber.

A still further object of the present invention is to provide a method for controlling the shape of the wave profile under the air cushion chamber to reduce wave profile drag and cross hull wave interaction drag.

Another object of the present invention is to provide a lateral force for sway control through the differential use of air nozzles on opposing sides of the air cushion chamber.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings wherein:

DESCRIPTION OF THE PREFERRED EMBODIMENT

Figure 1:
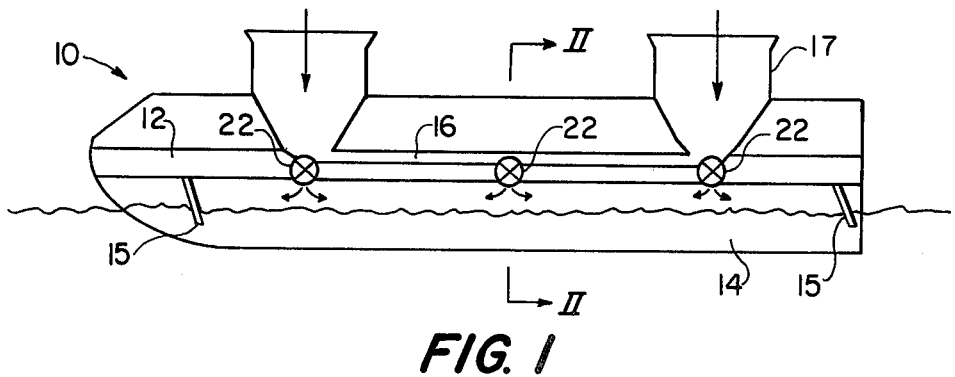
FIG. 1 is a diagrammatic illustration of a surface effect ship with the drag reduction system of the present invention.
Figure 2:
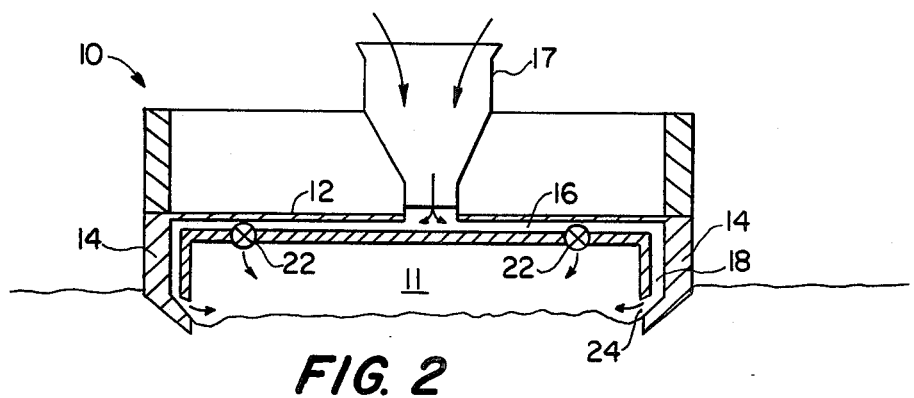
FIG. 2 is a cross-sectional view of the surface effect ship of FIG. 1, as seen in the plane of line II—II, and showing the general construction thereof.

Referring now to the drawings, wherein like reference numerals designate the same part throughout the several views, there is shown in FIG. 1 a surface effect ship 10 of the captured air bubble type. As best shown in FIG. 2, an air cushion chamber 11, which supports surface effect ship 10, is formed in part by a pair of parallel rigid sidewalls 14 which depend from a carrier platform 12. The construction of the sidewalls 14 is such that they will always penetrate the surface of the water and maintain contact therewith, maintaining the air seal and containing the air bubble therebetween, with the depth of penetration depending upon the degree of pressurization of chamber 11. The bow and stern portions of chamber 11 are closed off, for example, by flexible seals 15 that depend from carrier platform 12.

Figure 3:
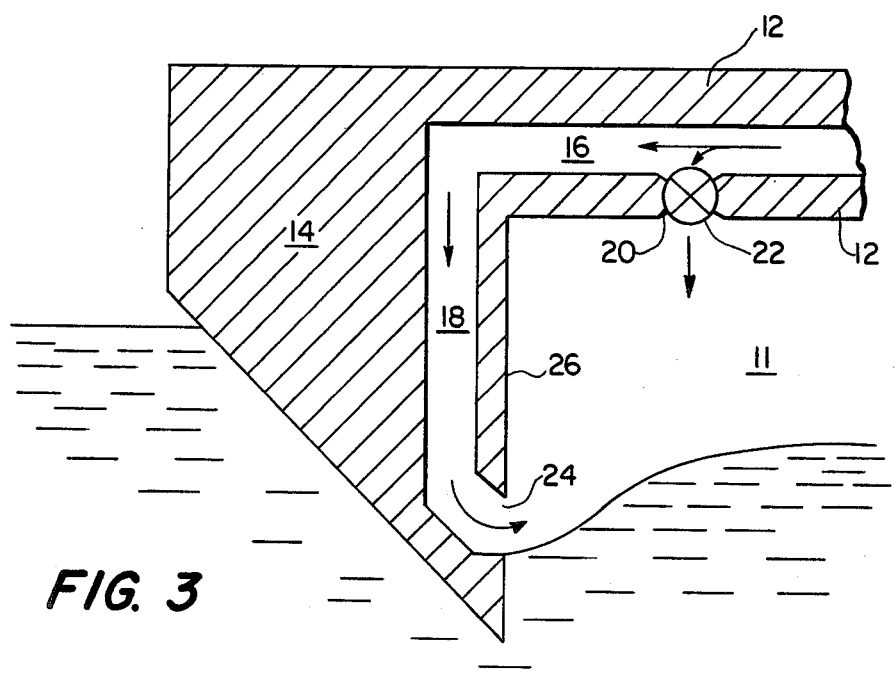
FIG. 3 is a cross-sectional view of a portion of the surface effect ship air cushion showing the drag reduction system in greater detail.
Figure 5:
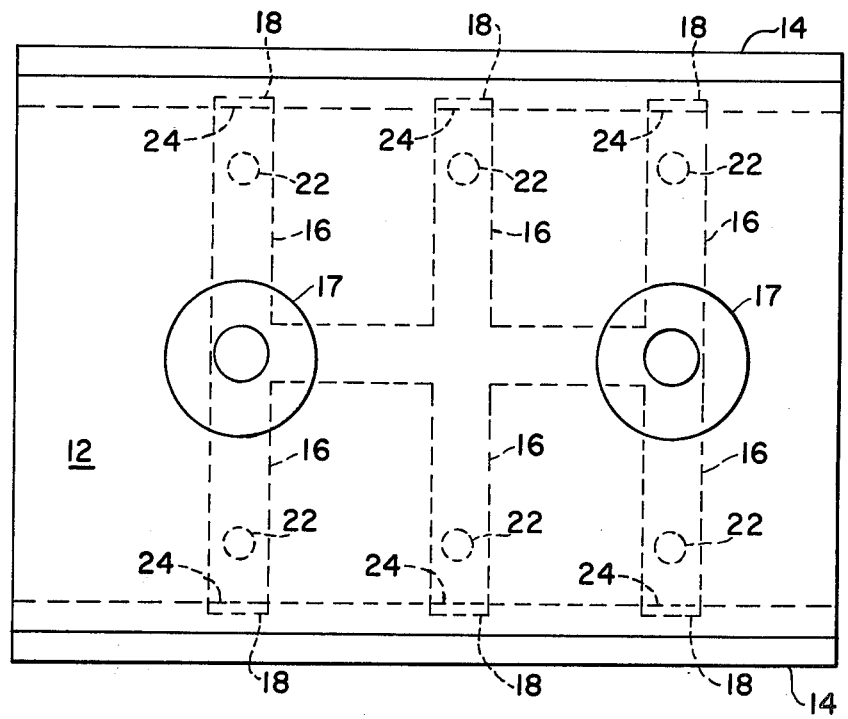
FIG. 5 is a diagrammatic top view of the surface effect ship, showing the general pattern of the air ducts.

Referring to FIGS. 2 and 3, the means for pressurizing air cushion chamber 11 will now be described in detail. A plurality of platform ducts 16, generally shown in FIG. 5, are located internally of carrier platform 12 and are connected to sources of air pressurization 17. Each platform duct 16 opens into chamber 11 through a series of ports 20, wherein a port valve 22 is provided to regulate the amount of pressurized air entering chamber 11.

A plurality of sidewall ducts 18, positioned internal of sidewalls 14, continue platform duct 16 to a point near the bottom of the sidewalls 14. A series of nozzles 24 on the interior surface 26 of sidewall 14 opens sidewall duct 18 into chamber 11. The platform ducts 16 and sidewall ducts 18 may conveniently be formed as an integral part of carrier platform 12 and sidewalls 14, respectively.

In operation, as shown by the arrows in FIGS. 1-3, pressurized air is carried through platform duct 16 and discharges downward into chamber 11 through port valve 22, while pressurized air in sidewall duct 18 feeds through nozzle 24 into chamber 11 in a substantially horizontal direction. The air discharging through the nozzles 24 creates a trough in the interior free surface of the water in chamber 11 adjacent to each sidewall 14. In this manner, sidewall drag is reduced as a result of a decreased area of water contact with the sidewall interior surfaces 26.

Any tendency of the surface effect ship 10 to sway, or move in a transverse direction during straight-line travel or during maneuvering, can be counteracted by regulating the air discharge from sidewall nozzles 24 in such a manner as to create a force in opposition to the undesired sway forces. In the disclosed embodiment, this is accomplished by regulating the relative positions of port valves 22 to allow a greater or lesser quantity of air to discharge therethrough, and consequently allow a lesser or greater quantity of air to discharge through the corresponding nozzles 24. Referring to FIG. 2, if a resultant force to the left (in the drawing) is required, the left port valve 22 is partially closed while the right port valve 22 (in the drawing) is fully open. Assuming a constant pressure in duct 16, a greater amount of air will discharge from the left nozzle 24 relative to the right nozzle 24 (in the drawing), thus creating a pressure difference at the respective sidewalls 14 to produce a resultant net force towards the left (in the drawing).

In an alternative embodiment, the sidewall ducts 18 and the platform ducts 16 can be supplied from separate pressurized air sources, thereby allowing the air discharge from the sidewall nozzles 24 to be regulated without affecting the port valve 22 air discharge.

Figure 4:
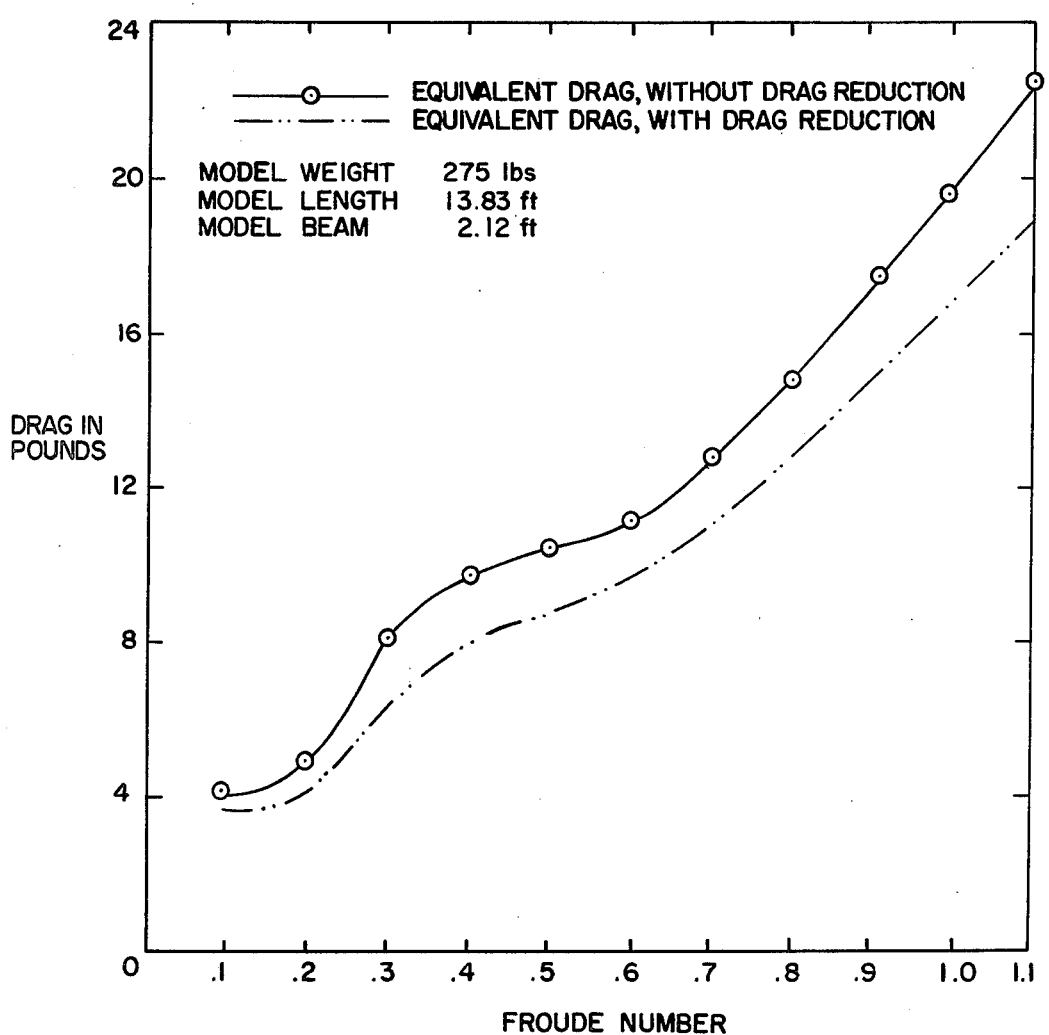
FIG. 4 is a graph showing the drag reduction in a model employing the present invention.

By way of example, without limiting the scope of the present invention, FIG. 4 shows the decrease in drag that may be expected for the given surface effect ship model employing the drag reduction system of the present invention. The equivalent drag in pounds is shown as a function of velocity expressed as the Froude number, which is defined as $V/(gl)^{\frac{1}{2}}$; where V is the velocity scale and l is the length scale of the system under consideration, and g is the acceleration due to gravity.

Thus it is apparent that there is provided by this invention a captured air bubble type surface effect ship having reduced sidewall drag and a sway control system, which require no additional power for air injection and thereby impose no additional lift fan drag.

It is to be understood that what has been described is merely illustrative of the principles of the invention and that numerous arrangements in accordance with this invention may be devised by one skilled in the art without departing from the spirit and scope thereof.

What is claimed is:

1. In a surface effect vehicle having a captured air bubble type air cushion chamber, with rigid surface-piercing sidewalls depending from a carrier platform, a drag reduction system comprising:

first means for discharging pressurized air into said chamber from said platform; and second means discharging pressurized air into said chamber from said sidewalls for depressing the free surface of the water within said chamber adjacent said sidewalls;

said first means includes a plurality of ducts positioned within said platform and extending within said sidewalls and connected to said second means;

a plurality of ports in communication with said ducts and opening into said chamber; and a plurality of valves, each affixed to one of said ports and configured to regulate the discharge of said pressurized air into said chamber, said first and said second means being interconnected, each of said valves being adjustable for proportioning the air flow between said first and second means.

2. A drag reduction system as set forth in claim 1, wherein said second means comprises:

a plurality of ducts located within said sidewalls; and a plurality of nozzles affixed to said sidewall ducts and opening into said chamber, said pressurized air being discharged through said nozzles into said chamber adjacent said sidewalls.

3. A drag reduction system as set forth in claim 2, wherein said nozzles are located near the bottom of the air cushion side of said sidewalls.

* * * * *